H. D. KELLY.
COFFEE URN.
APPLICATION FILED MAR. 8, 1915.
1,210,079.
Patented Dec. 26, 1916.
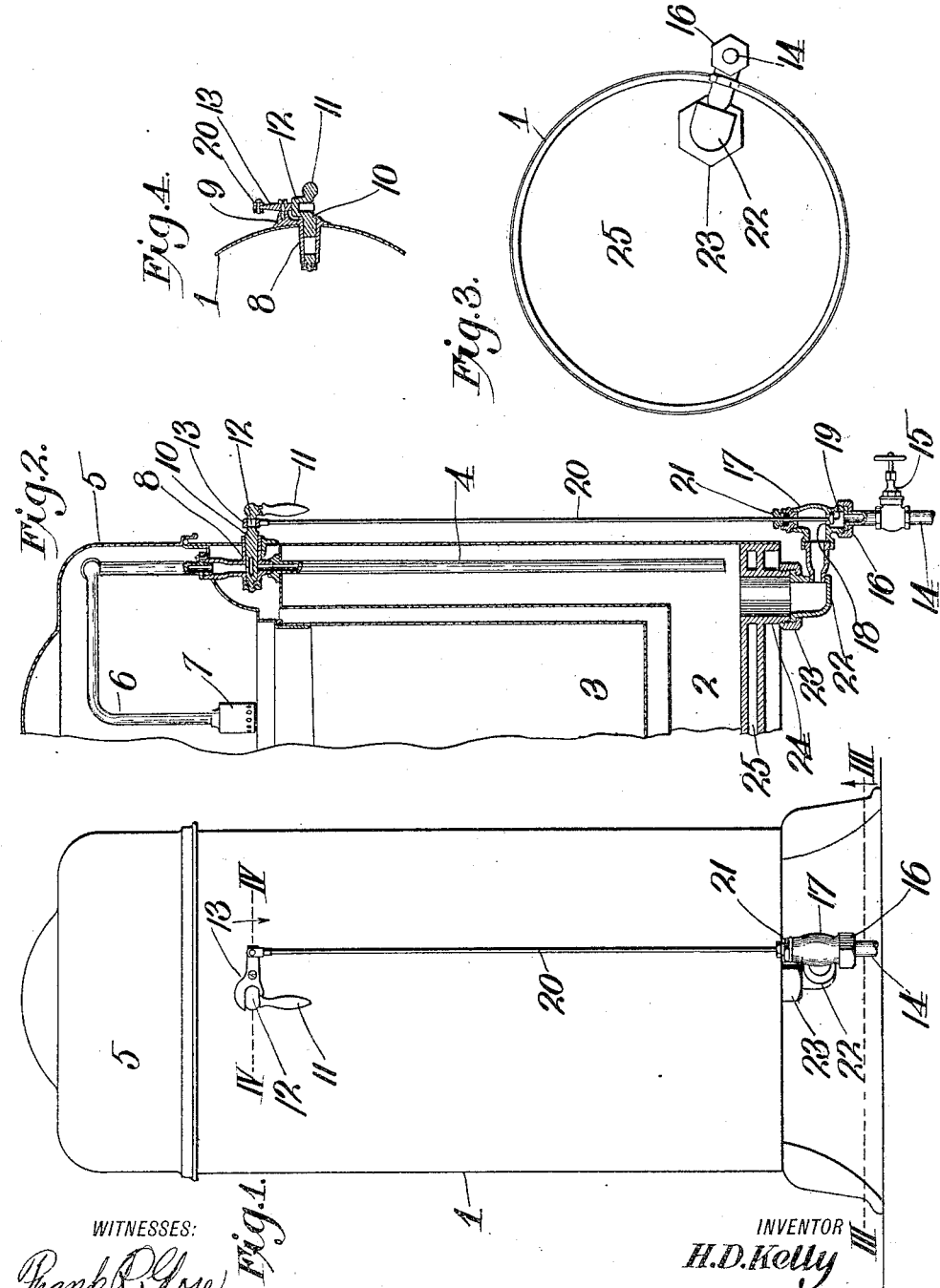
WITNESSES:
Frank R. Stove
H. C. Rodgers
INVENTOR
H. D. Kelly
BY
George J. Thorpe
ATTORNEY

UNITED STATES PATENT OFFICE.

HENRY D. KELLY, OF KANSAS CITY, MISSOURI.

COFFEE-URN.

1,210,079.  Specification of Letters Patent.  Patented Dec. 26, 1916.

Application filed March 8, 1915. Serial No. 12,836.

*To all whom it may concern:*

Be it known that I, HENRY D. KELLY, a citizen of the United States, residing at Kansas City, in the county of Jackson and State of Missouri, have invented certain new and useful Improvements in Coffee-Urns, of which the following is a specification.

This invention relates to coffee urns, of that class in which cold water is supplied to the boiler chamber of the urn, from a valve-controlled service pipe, and boiling water is forced by the pressure of steam generated in the water chamber, from the latter over ground coffee contained in the usual leaching bucket suspended over the coffee beverage jar. As well known, the best quality of coffee beverage cannot be obtained with urns of this character, unless boiling water is poured upon the ground coffee, and heretofore the construction of urns has been such that a careless or ignorant attendant could replenish the boiler chamber with cold water while the coffee making operation was in progress. The consequence was that almost immediately the temperature of the water pouring into the ground coffee was lowered below the temperature required to produce a beverage of the best quality and shortly thereafter the quantity of cold water supplied resulted in condensing the steam in the boiler chamber and hence in reducing the pressure necessary to effect the flow of water to the leaching bucket. Frequently, in such cases, complaint was made to the manufacturer or jobber of the urn and he was put to the trouble of giving further instructions regarding the proper method of handling the urn.

The object of this invention is to avoid the possibility of careless or ignorant attendants permitting cold water to flow into the boiler chamber while the coffee making operation is in progress, by the production of an urn provided with means which automatically cuts off the supply of cold water to the boiler chamber the instant the valve is opened to permit the steam to force boiling water onto the coffee suspended over the jar.

More specifically my object is to provide the water service pipe with a valve between the main valve of said pipe and the urn, connected to and operable only through the operation of the valve controlling the boiling water supply pipe, so that when the latter is opened the said intermediate valve shall be closed, and when the boiling water supply pipe valve is closed, the said intermediate valve shall be opened.

With the object named in view, the invention consists in certain novel and peculiar features of construction and combinations of parts as hereinafter described and claimed; and in order that it may be fully understood reference is to be had to the accompanying drawing, in which:

Figure 1, is a side elevation of a coffee urn equipped with mechanism embodying my invention, other features common in coffee urn construction, being omitted. Fig. 2, is a vertical section of the urn the section being irregular so as to include the mechanism of the invention. Fig. 3, is a section on the line III—III of Fig. 1, the legs of the urn and the pipe connections having no relation to the improvement, being omitted. Fig. 4, is a horizontal section on the line IV—IV of Fig. 1.

In the said drawing, 1 is the urn, 2 the water chamber thereof and 3 the beverage jar thereof.

4 is the pipe extending vertically through the water chamber for conveying boiling water from the boiler chamber under pressure of steam generated in said chamber.

5 is the hood of the urn containing an angle pipe 6 which connects and communicates with the upper end of pipe 4 within the hood, and the lower end of pipe 6 is equipped with a discharge nozzle 7 by which the water is sprayed into ground coffee contained in a leaching bucket suspended into or over the upper end of the jar. Said leaching bucket is not shown as it forms no part of the invention.

8 is a valve casing located in pipe 4 above the boiler chamber and below the hood, and said casing extends through the shell of the urn and is equipped with a boss 9, for a purpose which hereinafter appears. Journaled in the valve casing 8 is a valve 10 for controlling the passage of water through pipe 4, and provided at its outer end with an operating handle 11, and near said outer end with a crank 12 engaging the forked end of a short lever 13 fulcrumed as shown on boss 9, the function of this lever will hereinafter appear.

14 is a cold water service pipe for the urn, provided with a main controlling valve 15, and connected by a union 16 to the lower end of an intermediate valve casing 17, located vertically under the lever 13, and said valve casing is provided with a perforated diaphragm 18 for engagement at times by a valve 19 secured on the lower end of a rod 20, extending upward through a stuffing box 21, at the upper end of casing 17, and pivotally attached at its upper extremity to the opposite end of the lever 13 from the forked end thereof.

22 is an elbow connected to the valve casing 17 above the diaphragm thereof, and connected by a union 23 to a tubular boss 24, formed on the bottom 25 of the urn, the parts 22 and 24 establishing communication between valve casing 17 and the boiler chamber 2.

Assuming that the leaching bucket is charged with ground coffee and that the parts described are arranged as shown, with the main cold water service pipe valve 15 closed and the hot water pipe valve 10 closed, it will be seen that the crank 12 is depressed and hence holds lever 13 with valve 19 unseated or open. To make coffee under the conditions named the operator manipulates valve handle 11 to open the valve 10 and consequently, through the operation of lever 13 by the crank 12, lifts rod 20 until valve 19 is seated. As the hot water valve is thus opened the steam pressure in the boiler chamber is free to force the water downward and hence establish a circulation of the boiling water up through pipes 4 and 6 and nozzle 7 onto the ground coffee, through which it percolates, and in such passage be transformed into a coffee beverage which is received by the jar 3. While this operation is in progress the opening of valve 15 will not result in the entrance of cold water into the boiler chamber as the closed valve 19 guards against such result, nor is it possible to get cold water into the boiler chamber except by closing the hot water pipe valve. It will thus be seen that neither through accident nor design is it possible to check the flow of boiling water through the pipe 4 and that in consequence the quality of the coffee will be uniform because it is impossible to supply any water to the ground coffee unless the steam pressure in the boiler chamber is sufficient. After the desired quantity of coffee beverage has been made, the operator can replenish his boiler chamber with cold water by closing valve 10 and therefore opening valve 19, provided valve 15 is open. With an urn equipped with this improvement the valve 15 will normally stand closed, to guard against the entrance of cold water when valve 10 is closed.

From the above description it will be apparent that I have produced a coffee urn embodying the features enumerated as desirable and while I have illustrated and described the preferred embodiment of the invention, it is to be understood that I reserve the right to make all changes which properly fall within the spirit and scope of the appended claims.

I claim:

1. A coffee urn provided with a boiler chamber and a beverage jar, a water pipe communicating at its receiving end with the said chamber and terminating at its discharge end over said jar, a valve controlling the passage of said pipe and provided with an operating handle exterior to the urn, a cold water supply pipe connection for the water chamber, a valve in said connection, and means whereby the opening or closing of the first-named valve shall respectively close or open the other valve.

2. A coffee urn provided with a boiler chamber and a beverage jar, a water pipe communicating at its receiving end with the said chamber and terminating at its discharge end over said jar, a valve controlling the passage of said pipe and provided with an operating handle exterior to the urn, a cold water supply pipe connection for the water chamber, a valve in said connection, a lever connected to the valve in said connection, and means whereby the opening or closing operation of said first-named valve shall operate said lever to effect the closing or opening respectively of the other valve.

3. A coffee urn provided with a boiler chamber and a beverage jar, a water pipe communicating at its receiving end with the said chamber and terminating at its discharge end over said jar, a valve controlling the passage of said pipe and provided with an operating handle exterior to the urn, a cold water supply pipe connection for the water chamber, a valve in said connection, a crank on the first-named valve, a lever operable by turning movement of said crank, and means whereby the operation of said lever through the closing or opening of the first-named valve shall respectively open or close the valve in said connection.

4. A coffee urn provided with a boiler chamber and a beverage jar, a water pipe communicating at its receiving end with the said chamber and terminating at its discharge end over said jar, a valve controlling the passage of said pipe and provided with an operating handle exterior to the urn, a cold water supply pipe connection for the water chamber, a valve in said connection, a rod connected to said last-named valve to seat or unseat the same, a lever pivotally connected at one side of its pivot to said rod, and a crank formed on the first-named valve and operably engaging the said lever at the opposite side of its pivotal point from said rod; said crank when turned by the closing or the opening operation of the first-named valve, transmitting power through said lever and rod to respectively open or close the valve in said connection.

5. A coffee urn provided with a boiler chamber and a beverage jar, a water pipe communicating at its receiving end with said chamber near the bottom thereof and terminating at its discharge end over said jar, a valve controlling said pipe, a cold water supply pipe connection for said chamber, a valve controlling said supply pipe connection, a second valve in said connection between the first-named valve and said chamber, and means whereby the opening or closing of the valve controlling the pipe which terminates over the said jar, shall respectively close or open the said connection valve arranged between the other connection valve of the said chamber.

In testimony whereof, I affix my signature in the presence of two witnesses.

HENRY D. KELLY.

Witnesses:
 H. C. RODGERS,
 G. Y. THORPE.

Copies of this patent may be obtained for five cents each, by addressing the "Commissioner of Patents, Washington, D. C."